(12) United States Patent
Schierling

(10) Patent No.: US 10,727,668 B2
(45) Date of Patent: Jul. 28, 2020

(54) EFFICIENT PRE-CHARGING OF SECTIONS OF A DC VOLTAGE NETWORK

(71) Applicant: SIEMENS AKTIENGESELLSCHAFT, München (DE)

(72) Inventor: Hubert Schierling, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/495,959

(22) PCT Filed: Mar. 20, 2018

(86) PCT No.: PCT/EP2018/056941
§ 371 (c)(1),
(2) Date: Sep. 20, 2019

(87) PCT Pub. No.: WO2018/172313
PCT Pub. Date: Sep. 27, 2018

(65) Prior Publication Data
US 2020/0136384 A1 Apr. 30, 2020

(30) Foreign Application Priority Data
Mar. 23, 2017 (EP) .................................. 17162603

(51) Int. Cl.
*H02J 1/10* (2006.01)
*H02J 7/00* (2006.01)
*H02J 1/06* (2006.01)

(52) U.S. Cl.
CPC ............... *H02J 1/108* (2013.01); *H02J 1/06* (2013.01); *H02J 7/007* (2013.01)

(58) Field of Classification Search
CPC .......... H02M 1/08; H02M 1/008; H02M 1/38; H02J 1/06; H02J 1/08; H02J 1/106; H02J 1/108; H02J 7/007; H02J 13/0003
See application file for complete search history.

(56) References Cited

U.S. PATENT DOCUMENTS 6,654,262 B2 *  11/2003  Hussein .................. H02M 1/36
                                                     363/49
9,859,786 B2 *   1/2018  Hufnagel ............ H02M 1/4225
(Continued)

FOREIGN PATENT DOCUMENTS

EP          2595293 A2      5/2013

OTHER PUBLICATIONS

PCT International Search Report and Written Opinion of International Searching Authority dated Sep. 7, 2018 corresponding to PCT International Application No. PCT/EP2018/056941 filed Mar. 20, 2018.

*Primary Examiner* — Matthew V Nguyen
(74) *Attorney, Agent, or Firm* — Henry M. Feiereisen LLC

(57) ABSTRACT

The invention relates to a DC voltage network having a plurality of sections (1) which can be connected together and separated from one another individually or in groups via a respective switch element (5). A pre-charging circuit (10) has diode groups (11), a switch device (12), an energy transmission path (13), and a controller (14). Each of the sections (1) of the DC voltage network is coupled to the energy transmission path (13) via at least one respective diode group of the diode groups (11). The energy transmission path (13) is consistently the same for the diode groups (11). The controller (14) transmits a control signal (S) to the switch device (12) in order to pre-charge sections (1), and the switch device (12) thereby switches the energy trans- (Continued)

mission path (13) for all of the sections (1) coupled to the energy transmission path (13) so as to be conductive.

13 Claims, 4 Drawing Sheets

(56) References Cited

U.S. PATENT DOCUMENTS

| | | |
|---|---|---|
| 2013/0119763 A1 | 5/2013 | Zhu et al. |
| 2013/0119903 A1 | 5/2013 | Weiss |
| 2015/0229203 A1* | 8/2015 | Esmaili .................. H02H 9/001 363/49 |
| 2016/0204709 A1* | 7/2016 | Patel ....................... H02M 5/44 363/37 |

* cited by examiner

EFFICIENT PRE-CHARGING OF SECTIONS OF A DC VOLTAGE NETWORK

CROSS-REFERENCES TO RELATED APPLICATIONS

This application is the U.S. National Stage of International Application No. PCT/EP2018/056941, filed Mar. 20, 2018, which designated the United States and has been published as International Publication No. WO 2018/172313 A1 and which claims the priority of European Patent Application, Serial No. 17162603.9, filed Mar. 23, 2017, pursuant to 35 U.S.C. 119(a)-(d).

BACKGROUND OF THE INVENTION

The present invention relates to a pre-charging circuit for a plurality of sections of a DC voltage network, wherein said sections can be connected together and separated from each other individually or in groups via a respective switch element.

The present invention further relates to a DC voltage network,
  wherein the DC voltage network has a plurality of sections,
  wherein the DC voltage network has a switch element for each of the sections, via which the respective section can be connected to and separated from the other sections,
  wherein the DC voltage network has such a pre-charging circuit.

DC voltage networks are used in many cases for energy distribution within closed systems (for example within manufacturing installations). Energy distribution via DC voltage has a number of advantages over energy distribution via AC voltage. The exchange of energy between individual sections of the network is simpler, for example. In particular, reciprocal coordination of frequency and phase position of the individual sections is not required.

Such a DC voltage network usually consists of a plurality of sections, which can be separated from each other and connected together by a switch element in each case. Said sections can have the widest variety of energy sources (for example a photovoltaic installation) or energy stores (for example batteries) and the widest variety of consumer units. Also present in many cases is a connection via a voltage converter to a three-phase voltage network which feeds the DC voltage network. The connection to the three-phase voltage network can also be considered as a section within the meaning of the present invention.

When the DC voltage network is shut down or separated from the three-phase network, or when various sections of the DC voltage network are separated from each other, the situation can arise that the individual sections have differing voltages. In such instances, the sections must not be simply connected together since this would at least briefly result in extremely high equalizing currents.

In order to keep the equalizing currents low or even prevent these completely if possible, the sections can have capacitive energy stores which are pre-charged before the connection of a respective section to the other sections. The voltage of the respective section is thereby adapted so closely to the voltage of the other sections that the connection of the respective section to the other sections then results in only a low equalizing current.

In the prior art, pre-charging circuits are used to pre-charge the capacitive energy stores. For the purpose of pre-charging the capacitive energy store, a respective pre-charging circuit is customarily connected in parallel with the switch element for the respective section. The pre-charging circuit usually consists of a series circuit of an electronic or electromechanical switch and a resistor.

This solution according to the prior art has various disadvantages. Firstly, a dedicated pre-charging circuit is required for each section. Furthermore, electrical losses occur in the resistor when pre-charging. Furthermore, the capacity of the resistor must be adapted to the section of the DC voltage network to be charged in each case, both in relation to the maximum charging current and in relation to the power loss occurring in the resistor.

A further solution according to the prior art proposes the pre-charging of a section by means of a voltage source, for example an AC/DC converter or a DC/DC converter. In this case, the electrical losses can be reduced. However, a controllable converter is still required for each section. The converter must be fed from that section which is intended to deliver the required energy. This means that the configuration must be defined specifically for each DC voltage network. The capacity of the converter must be adjusted to the requirements of the section that is to be pre-charged, and to those of the section which feeds the section that is to be pre-charged.

The object of the present invention is to provide possibilities by means of which the pre-charging of the sections can be realized in a simple, efficient and economical manner.

SUMMARY OF THE INVENTION

The object is achieved according to the invention by a pre-charging circuit for a plurality of sections of a DC voltage network, which sections can be connected together and separated from each other individually or in groups via a respective switch element.
  wherein the pre-charging circuit has diode groups, a switch device, an energy transmission path and a controller,
  wherein each of the sections of the DC voltage network is coupled to the energy transmission path via at least one respective diode group,
  wherein the energy transmission path is consistently the same for the diode groups, and
  wherein the controller transmits a control signal to the switch device in order to pre-charge sections that are separated from the other sections via their respective switch element, such that the switch device switches the energy transmission path so as to be conductive for all of the sections of the DC voltage network that are coupled to the energy transmission path.

Advantageous embodiments of the inventive pre-charging circuit are the subject matter of dependent claims.

By means of this embodiment, whenever the switch device switches the energy transmission path so as to be conductive, that section which is coupled to the energy transmission path and has the lowest voltage (and only this section) is pre-charged from that section which is coupled to the energy transmission path and has the highest voltage (and only from this section).

The energy transmission path is preferably designed as an inductive energy transmission path. It is thereby possible to effect an efficient and low-loss energy transmission from one section to the other section.

It is possible that only one of two potentials of the section attached to the respective diode group is coupled to the energy transmission path via the diode groups. In this case, the switch device is preferably arranged in the energy transmission path. As a result, the switch device can be embodied in a very simple manner.

Alternatively, it is possible that both potentials of the section attached to the respective diode group are coupled to the energy transmission path via the diode groups. In this case, the energy transmission path is preferably metallically isolated from the diode groups. The advantages of a metallic isolation are readily apparent.

In this case, the switch device preferably has a plurality of partial switch devices, each of these being assigned to a diode group. A simple format of the switch device is achieved thereby.

It is possible for the partial switch devices to be activated individually by the controller. However, consistent activation is preferred. This embodiment simplifies the structure and control of the pre-charging circuit.

The partial switch devices preferably connect the section which is attached to the respective diode group to the energy transmission path in the manner of an inverter as a result of the control signal transmitted by the controller. A simple type and manner of energy transmission can be achieved thereby.

In a particularly preferred embodiment of the pre-charging circuit, a resistor and a further switch device assigned to said resistor are assigned to the energy transmission path, such that the energy transmission path acts as a consumer unit when the further switch device is closed. Therefore the pre-charging circuit can also be used as a discharge circuit for the sections when required.

The object is further achieved according to the invention by a DC voltage network,
  wherein the DC voltage network has a plurality of sections,
  wherein the DC voltage network has a switch element for each of the sections, via which the respective section can be connected to and separated from the other sections,
  wherein the DC voltage network has a pre-charging circuit designed as a pre-charging circuit according to the invention, and
  wherein the sections of the DC voltage network are each connected to at least one of the diode groups of the pre-charging circuit.

Advantageous embodiments of the inventive DC voltage network are the subject matter of dependent claims.

It is possible for at least a proportion of the switch elements to be designed such that, depending on the switching status of the respective switch element, they separate or connect only one of two potentials of the sections from or to each other respectively, and they connect the other potential of the sections together permanently. Equally, it is possible for at least a proportion of the switch elements to be designed such that, depending on the switching status of the respective switch element, they separate or connect both potentials of the sections from or to each other respectively. The two formats are mutually exclusive in a single switch. However, a proportion of a plurality of switch elements can be designed according to the first cited embodiment and a complementary proportion according to the second cited embodiment.

According to a preferred embodiment,
  each of the switch elements has an electronic switch arrangement and, viewed from the electronic switch arrangement, an electromechanical switch at least in the direction of the respectively assigned section,
  a respective tap is arranged between the respective electronic switch arrangement and the respective electromechanical switch, and
  the sections are connected to the diode groups of the pre-charging circuit via the taps.

By means of this embodiment it is possible in a particularly simple manner, by corresponding activation of the electromechanical switches, in particular to select which sections are actually pre-charged by the pre-charging circuit.

BRIEF DESCRIPTION OF THE DRAWING

The properties, features and advantages described above in connection with the invention, and the manner in which these are achieved, become clearer and more comprehensible in the context of the following description of the exemplary embodiments as explained in greater detail with reference to the drawings, in which.

DETAILED DESCRIPTION OF PREFERRED EMBODIMENTS

The present invention relates generally to substantive matter of an electrotechnical nature. Terms such as "connected" and "separated" or "isolated" and the like are therefore always meant in the electrical sense and not in the mechanical sense.

Figure 1:
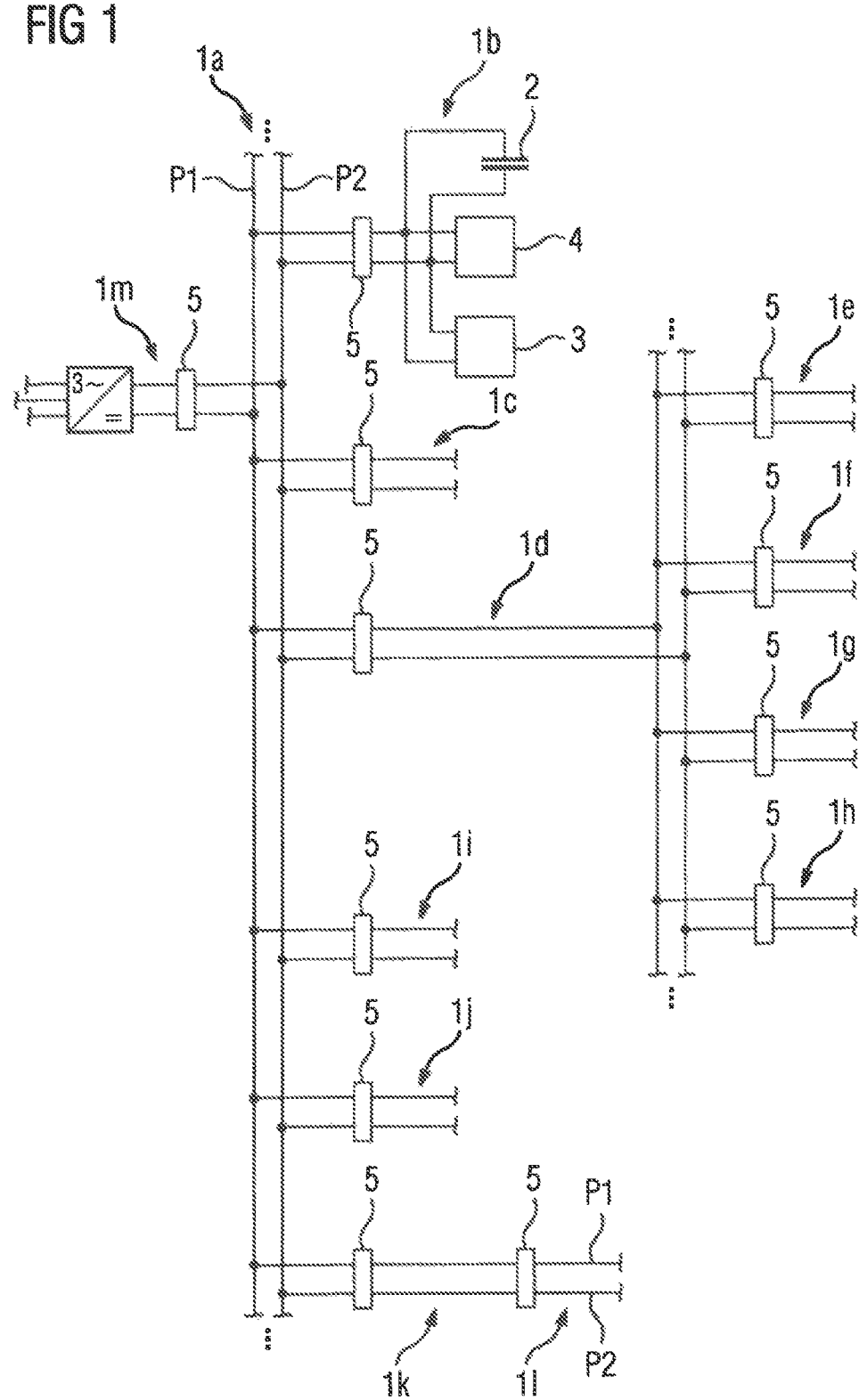
FIG. 1 shows a schematic illustration of a DC voltage network comprising a plurality of sections.

According to FIG. 1, a DC voltage network has a multiplicity of sections 1. In the illustration as per FIG. 1, the sections 1 are additionally supplemented by an individual lower case letter. In the following, when reference is made to a specific section 1 illustrated in FIG. 1, the reference sign supplemented by the corresponding lower case letter is used, i.e. for example the reference sign 1c or the reference sign 1f. However, when reference is made generally to the sections 1, the reference sign 1 is used alone without being supplemented by a lower case letter.

The DC voltage network usually has a central section. In the illustration as per FIG. 1, this is the section 1a. The central section 1a represents the "hub" for the other sections 1. The central section 1a is therefore shared by the other sections 1.

It is apparent from FIG. 1 that the sections 1 can form branches and sub-branches in a similar manner to a tree structure. For example, the section 1d is subdivided into further sections 1e to 1h. A plurality of sections 1 can also be connected one behind the other. These are the sections 1k and 1l in the illustration as per FIG. 1. The "section" 1m represents the connection of the central section 1a to an AC network, which is a three-phase network here.

The type of the sections 1 as such can be determined as required. However, they usually have an electrical energy store 2 in each case. The energy store 2 can be a battery or a capacitor, for example. In addition, the sections 1 generally have at least one energy source 3 and/or at least one consumer unit 4. An example of an energy source 3 is a photovoltaic installation or a (charged) battery. Examples of consumer units 4 include an electrical drive, a heating device and an (uncharged) battery. However, other energy sources 3 and other consumer units 4 may also be present. Combinations are also possible. For reasons of clarity, the energy store 2, the energy source 3 and the consumer unit 4 are marked in for only one of the sections 1 in FIG. 1. However, the corresponding units 2, 3 and 4 can also be present in the other sections 1.

The DC voltage network has a switch element 5 for each of the sections 1. Depending on the activation of the respective switch element 5, the respective section 1 can be connected to at least one other section 1 and separated from the at least one other section 1 via the respective switch element 5. This means that the sections 1b to 1l can be connected to the central section 1a or separated therefrom, either directly or indirectly via other sections 1. For example, the connection or separation of the switch element 5 of the section 1f effects the connection or separation of the section 1f to or from the section 1d respectively. Depending on the switching status of the switch element 5 for the section 1d, the section 1f is therefore connected to or separated from the central section 1a via the section 1d, or is merely connected to or separated from the section 1d without further connection to the central section 1a.

As a result of the embodiment as a DC voltage network, the sections 1 have a positive potential P1 and a negative potential P2. For reasons of clarity, the potentials P1, P2 are marked in for only the sections 1a and 1f in FIG. 1. Lines having identical potentials P1, P2 in the sections 1 can be connected together via the switch elements 5, i.e. for example the positive potential P1 of one of the sections 1 to the positive potentials P1 of the other sections 1, and likewise the negative potential P2 of this section 1 to the negative potentials P2 of the other sections 1. A "cross connection", i.e. for example of the positive potential P1 of the central section 1a to the negative potential P2 of one of the other sections 1, is however not permitted.

Figure 2:
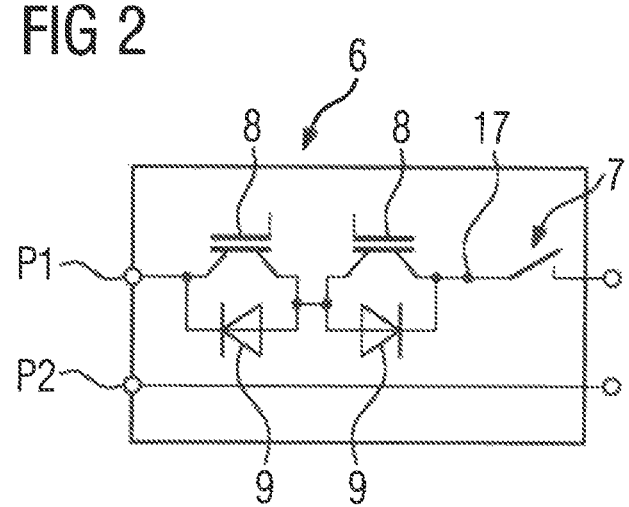
FIG. 2 shows a schematic illustration of a possible embodiment of a switch element.

In the simplest case, the switch elements 5 are designed as per FIG. 2. According to FIG. 2, the respective switch element 5 is designed in such a way that—depending on the switching status—it separates only the positive potential P1 of the respective section 1 from the positive potential P1 of the other sections 1, or connects only the positive potential P1 of the respective section 1 to the positive potential P1 of the other sections 1. By contrast, the negative potentials P2 of the sections 1 are permanently connected together. In the case of the embodiment according to FIG. 2, only a single-pole separation of the respective section 1 from the other sections 1 therefore takes place when applicable. This means that only one (1) switching path is present. Without restricting general applicability, it can always be assumed in this context that the positive potential P1 is the switched potential, while the negative potential P2 is unswitched. However, the opposite approach is also possible in principle.

Figure 3:
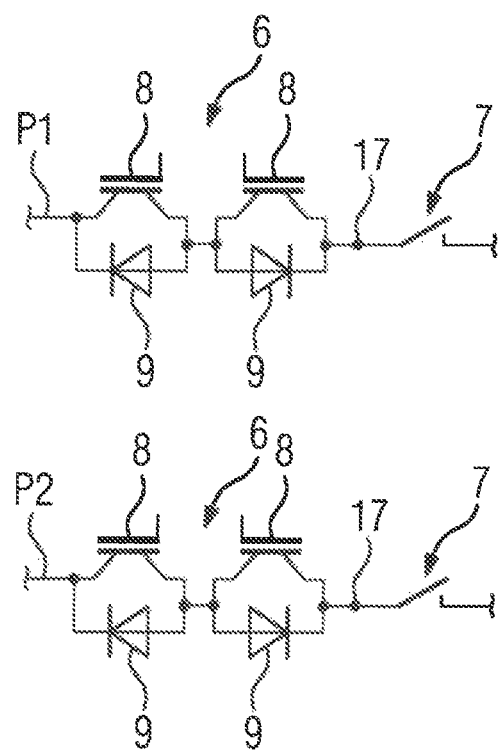
FIG. 3 shows a schematic illustration of a further possible embodiment of a switch element.

Alternatively, the switch elements 5 are designed as per FIG. 3. According to FIG. 3, the respective switch element 5 is designed in such a way that—depending on the switching status—it separates the positive potential P1 of the respective section 1 from the positive potential P1 of the other sections 1 or connects said positive potential P1 to the positive potential P1 of the other sections 1, and also separates the negative potential P2 of the respective section 1 from the negative potential P2 of the other sections 1 or connects said negative potential P2 to the negative potential P2 of the other sections 1. In the case of the embodiment according to FIG. 3, a two-pole separation of the respective section 1 from the other sections 1 therefore takes place when applicable. This means that two switching paths are present.

It is possible for all switch elements 5 to be designed consistently and homogeneously, i.e. either all realizing only a single-pole separation of the respective section 1 from the other sections 1 or all realizing a two-pole separation of the respective section 1 from the other sections 1. Mixed forms are however also possible, wherein a proportion of the switch elements 5 realize a single-pole separation of the respective section 1 from the other sections 1, and a further proportion of the switch elements 5 realize a two-pole separation of the respective section 1 from the other sections 1. For example, the switch elements 5 for the sections 1e to 1h can each effect a two-pole separation, while the switch elements 5 of the sections 1a to 1d and 1i to 1m effect only a single-pole separation.

The switch elements 5 usually have one electronic switch arrangement 6 for each switching path as per the illustrations in FIG. 2 and FIG. 3. The switch elements 5 also have, viewed from the electronic switch arrangement 6, an electromechanical switch 7 at least in the direction of the respectively assigned section 1. The respective electronic switch arrangement 6 and the respective electromechanical switch 7 are therefore connected in series. A series circuit of two electromechanical switches 7 and an electronic switch arrangement 6 can also be present when applicable. In this case, the electronic switch arrangement 6 is in the center of the series circuit. The electronic switch arrangement 6 can for example consist of two electronic switches 8 connected in series, with a diode 9 being connected in parallel to each of these. The two diodes 9 are polarized antiparallel to each other in this case. Therefore one of the two diodes 9 always blocks, irrespective of the activation of the two electronic switches 8. The electronic switches 8 can be designed as IGBTs according to the illustrations in FIG. 2 and FIG. 3, for example. Other embodiments are however also possible, for example as MOSFETs. The diodes 9 can be intrinsic parts of the electronic switches 8. Alternatively, they can be stand-alone electronic components.

As long as the sections 1 are connected together, the positive potentials P1 are equal among themselves and the negative potentials P2 are also equal among themselves. The potential difference U between the positive and negative potentials P1 and P2 is therefore also the same for the sections 1. The voltage U should be equal to a nominal value if possible. The nominal value can be selected as required. It can be 24 V, 100 V, 500 V or other suitable value, for example. When the sections 1 are separated from each other, the negative potential P2 remains the same for the sections 1 in the case of single-pole separation. By contrast, the positive potential P1 in this case can have individual values for the sections 1 or when applicable groups of sections 1. In the case of two-pole separation, this also applies to the negative potential P2. In both cases (i.e. either single-pole separation or two-pole separation), the voltage U can nonetheless have a separate value in each case for the respective section 1 or the respective group of sections 1.

When the voltage U of a section 1 differs from the voltage U of another section 1, the corresponding sections 1 must not be simply connected together via one of the switch elements 5. The DC voltage network therefore has a pre-charging circuit 10 for equalizing such voltage differences in advance. Two possible embodiments of the pre-charging circuit 10 are explained below with reference to FIG. 4 and FIG. 5.

Figure 4:
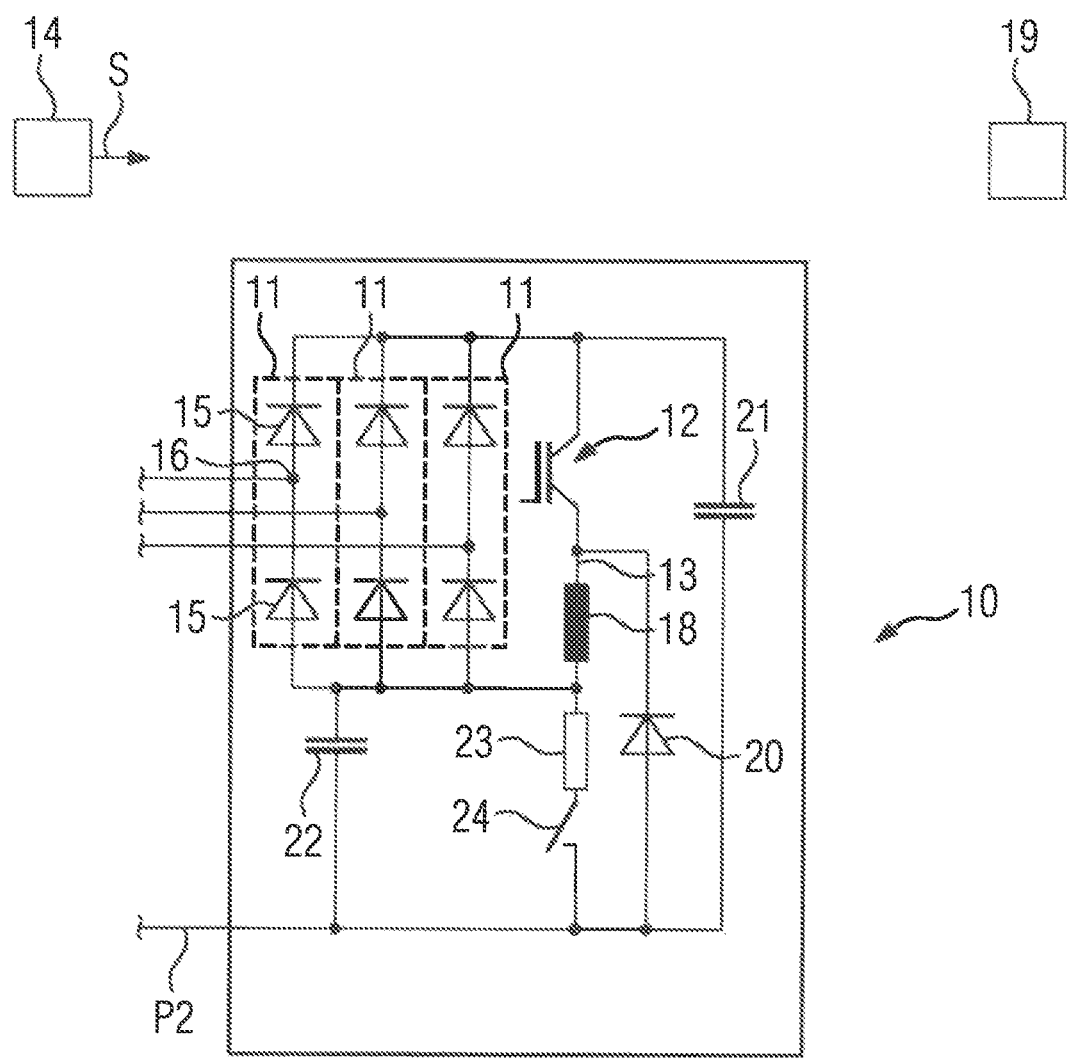
FIG. 4 shows a schematic illustration of a possible embodiment of a pre-charging circuit.

The pre-charging circuit 10 as per FIG. 4 has diode groups 11, a switch device 12, an energy transmission path 13 and a controller 14. The number of diode groups 11 can be determined as required. The number of three diode groups 11 illustrated in FIG. 4 is purely exemplary. The sections 1 of the DC voltage network are each connected to at least one of the diode groups 11 of the pre-charging circuit 10. The sections 1 of the DC voltage network are coupled to the energy transmission path 13 via the respective diode group 11. The energy transmission path 13 is consistently the same for the diode groups 11 and hence for the sections 1 also.

In the embodiment according to FIG. 4, the diode groups 11 for respectively coupling an individual section 1 to the energy transmission path 13 can each consist of a series circuit of two diodes 15 in each case, for example. In this case, the respective section 1 is connected to a nodal point 16 which is arranged between the two diodes 15 of the respective diode group 11. The reference signs for the diodes 15 and the nodal point 16 are marked in for only one diode group 11 in FIG. 4.

For the purpose of connecting the sections 1 of the DC voltage network to the diode groups 11 of the pre-charging circuit 10, as shown by the illustrations in FIG. 2 and FIG. 3 the switch elements 5 of the sections 1 can each have a tap 17 which is arranged between the respective electronic switch arrangement 6 and the respective electromechanical switch 7 of the respective switching path. In this case, the sections 1 can be connected via the respective tap 17 to the nodal point 16 of the respective diode group 11. When the switching paths of the switch elements 5, viewed from the electronic switch arrangement 6 in each case, have an electromechanical switch 7 in both directions in each case, the switching paths preferably also have two taps 17 in each case. In this case, one of the two taps 17 is arranged between the electronic switch arrangement 6 and one of the electromechanical switches 7 and the other between the electronic switch arrangement 6 and the other electromechanical switch 7. The two taps 17 are each connected to different diode groups 11 of the pre-charging circuit 10 in this case.

In order to pre-charge sections 1 which are separated from the other sections 1 via their respective switch element 5, the controller 14 transmits a control signal S to the switch device 12. The switch device 12 is thereby so controlled as to switch the energy transmission path 13 so as to be conductive. This effect is produced automatically for all sections 1 of the DC voltage network which are coupled to the energy transmission path 13.

In the pre-charging circuit 10 as per FIG. 4, in each case only the positive potential P1 of the sections 1 is coupled to the energy transmission path 13 via the diode groups 11. In this case, the switch device 12 can be arranged in the energy transmission path 13. In the embodiment according to FIG. 4, the switch device 12 can be designed as for example a simple electronic switch, in particular an IGBT or MOSFET.

When the switch device 12 switches the energy transmission path 13 so as to be conductive, by virtue of the diode groups 11 only that section 1 having the highest positive potential P1 and hence the highest voltage U feeds energy into the energy transmission path 13. Similarly, by virtue of the diode groups 11 only that section 1 having the lowest positive potential P1 and hence the lowest voltage U draws energy from the energy transmission path 13. By means of corresponding activation of the electromechanical switches 7 of the switch elements 5, it is furthermore possible to define which sections 1 can actually be pre-charged.

A current-limiting element 18 is arranged in the energy transmission path 13. The current-limiting element 18 can be designed as a resistor. In this case, the energy transmission path 13 is designed as a resistive energy transmission path. The current-limiting element 18 is however also preferably designed as a reactor. In this case, the energy transmission path 13 is designed an inductive energy transmission path.

In the case of the (preferred) embodiment of the current-limiting element 18 as a reactor, the element 18 does not strictly speaking limit the current I per se, but solely the rise thereof. As a result of the fact that no significant current limitation occurs in the energy transmission path 13 as per FIG. 4, the current I flowing via the energy transmission path 13 can take on high values. Therefore provision is preferably made for a monitoring device 19, which temporarily blocks the switch device 12 when applicable. However, the monitoring device 19 does not cause the switch device 12 to be blocked with lasting effect, but merely serves to protect the pre-charging circuit 10 against overloading. In particular, the monitoring device 19 can effect a current limitation in the energy transmission path 13 and/or a temperature limitation of the switch device 12. The monitoring device 19 can be designed in the manner of a current regulator, for example.

In order to protect the pre-charging circuit 10 against transient overvoltages when the switch device 12 is blocked, a freewheeling diode 20 is also connected in parallel with the current-limiting element 18. The freewheeling diode 20 can bypass exclusively the current-limiting element 18, for example. According to FIG. 4, the freewheeling diode 20 is connected to the negative potential P2.

Provision is also often made for a capacitor 21. The capacitor 21 is used for commutation. It can be dimensioned to be so small that pre-charging of the capacitor 21 is not necessary. Alternatively or additionally, a capacitor 22 may be provided. The capacitor 22 is used for decoupling from the intrinsic inductances of the input lines of the pre-charging circuit 10.

According to the illustration as per FIG. 4, a resistor 23 and a further switch device 24 assigned to the resistor 23 can also be assigned to the energy transmission path 13. As a result of the presence of the series circuit of the resistor 23 and the further switch device 24, the pre-charging circuit 10 can be used variously as required to pre-charge the sections 1 and to discharge the sections 1, depending on whether the resistor 23 is connected to the negative potential P2 via the further switch device 24 or remains separated therefrom. This means that the energy transmission path 13 can act as a consumer unit when the further switch device 24 is closed.

The embodiment of the pre-charging circuit 10 according to FIG. 4 is only possible when the switch elements 5 of the corresponding sections 1 effect only a single-pole separation of the sections 1 from each other. By contrast, the embodiment of the pre-charging circuit 10 according to FIG. 5 can be realized in all cases, i.e. irrespective of whether the switch elements 5 of the corresponding sections 1 effect only a single-pole separation of the sections 1 from each other, or the switch elements 5 of the corresponding sections 1 effect a two-pole separation of the sections 1 from each other.

Figure 5:
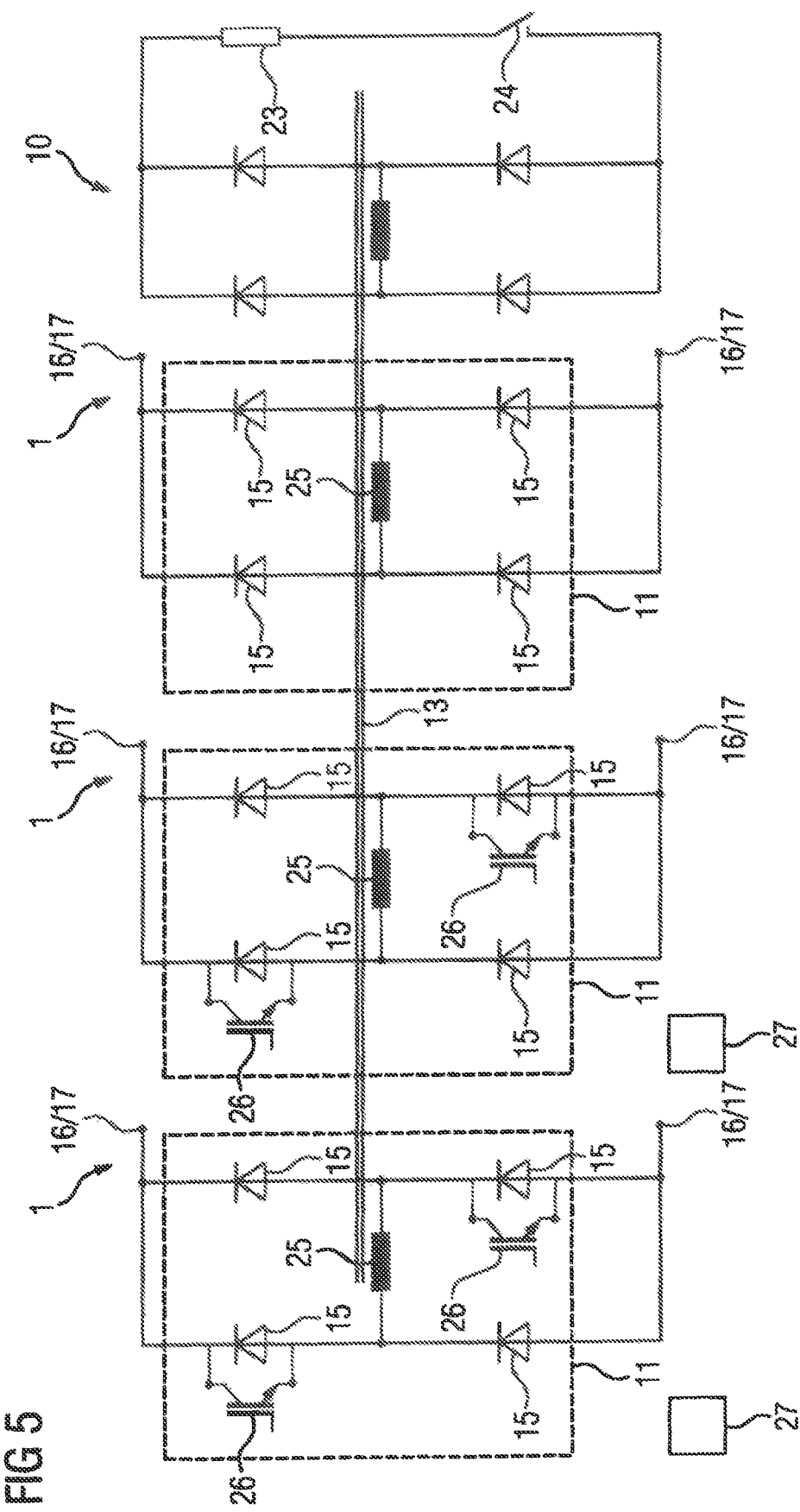
FIG. 5 shows a schematic illustration of a further possible embodiment of a pre-charging circuit.

As in the case of the pre-charging circuit 10 as per FIG. 4, the pre-charging circuit 10 as per FIG. 5 also has diode groups 11, a switch device 12, an energy transmission path 13 and a controller 14. The number of three diode groups 11 illustrated in FIG. 5 is again purely exemplary. Again here, the sections 1 of the DC voltage network are each connected to at least one of the diode groups 11 of the pre-charging circuit 10. The sections 1 of the DC voltage network are coupled to the energy transmission path 13 via the respective diode group 11. The energy transmission path 13 is consistently the same for the diode groups 11 and hence for the sections 1 also.

The diode groups 11 for coupling an individual section 1 in each case to the energy transmission path 13 can, in the embodiment according to FIG. 5, each be designed in the manner of a bridge rectifier for example. In this case, the respective section 1 is connected to two nodal points 16 which are arranged at the outputs of the bridge rectifier.

In the case of the embodiment as per FIG. 5, the sections 1 of the DC voltage network are again connected in each case to at least one of the diode groups 11 of the pre-charging circuit 10. In particular, the switch elements 5 of the sections 1 here can likewise have a tap 17 in each of their switching paths, as per the illustration in FIG. 3, said tap 17 being arranged between the respective electronic switch arrangement 6 and the respective electromechanical switch 7 of the respective switching path. In this case likewise, the sections 1 can be connected via the respective tap 17 to the nodal point 16 of the respective diode group 11. In contrast with the embodiment as per FIG. 4, in the case of the embodiment as per FIG. 5, taps 17 can however be present in both switching paths of the respective switch element 5, each of the two taps 17 being connected to one of the two nodal points 16. In the case of the embodiment as per FIG. 5, both potentials P1, P2 of the respective corresponding sections 1 are therefore coupled to the energy transmission path 13 via the diode groups 11.

The energy transmission path 13 in the case of the embodiment as per FIG. 5 is potentially decoupled or metallically isolated from the diode groups 11. For example, the energy transmission path 13 in the case of the embodiment as per FIG. 5 can be designed in the manner of a transformer core, windings 25 being arranged in the bridge branches of the bridge rectifiers. The energy transmission path 13 is thereby designed as an inductive energy transmission path. The windings 25 act as a primary winding or as a secondary winding of the transformer, depending on the direction of the energy flow. The windings 25 have the same number of turns per unit length. Therefore although a potential decoupling is effected via the windings 25 and the energy transmission path 13, no voltage transformation takes place.

In the case of the embodiment as per FIG. 5, the switch device 12 comprises a plurality of partial switch devices. The partial switch devices are assigned to a diode group 11 in each case. They each comprise two electronic switches 26 which are connected in parallel with a diode 15 in each case. The two electronic switches 26 are arranged in a diagonally opposite manner in relation to the bridge rectifier. The electronic switches 26 can be designed as IGBTs or as MOSFETs, for example.

In order to pre-charge sections 1 which are separated from the other sections 1 by their respective switch element 5, the controller 14 transmits a control signal S to the switch device 12 as before, whereby the switch device 12 is so controlled as to switch the energy transmission path 13 so as to be conductive. For example, the control signal S can cause the partial switch devices to connect the section 1 which is attached to the respective diode group 11 to the energy transmission path 13 in the manner of an inverter.

The partial switch devices are preferably activated by the controller 14 in a consistent manner. From the viewpoint of the controller 14, this means that preferably only a single control signal S is output. When the switch device 12 switches the energy transmission path 13 so as to be conductive, as in the case of the embodiment as per FIG. 4, only that section 1 having the highest voltage U feeds energy into the energy transmission path 13. Similarly, only that section 1 having the lowest voltage U draws energy from the energy transmission path 13. This effect is produced automatically for all sections 1 of the DC voltage network which are coupled to the energy transmission path 13. By means of corresponding activation of the electromechanical switches 7 of the switch elements 5, it is possible as before to define which sections 1 can actually be pre-charged.

In order to protect the pre-charging circuit 10 against overloading, monitoring devices 27 are preferably assigned to the partial switch devices. The monitoring devices 27 only act on the respective partial switch device and block this temporarily when applicable. However, the monitoring devices 27 do not cause the respective partial switch device to be blocked with lasting effect, but merely serves to protect the respective partial switch device against overloading. The operation of the monitoring devices 27 is similar to the operation of the monitoring device 19.

In the simplest case, a partial switch device is assigned to each diode group 11. Alternatively, it is however equally possible to assign a partial switch device in each case to only some of the diode groups 11, and no partial switch devices to other diode groups 11. In the latter case, the sections 1 that are coupled via the diode groups 11 to which no partial switch devices are assigned can only be pre-charged. Conversely, the sections 1 which are coupled to these diode groups 11 cannot feed any electrical energy into the energy transmission path 13. When such diode groups 11 are present, i.e. diode groups 11 without an assigned partial switch device, the corresponding diode groups 11 can be marked in order to prevent erroneous connection.

In a similar manner to the embodiment as per FIG. 4, a resistor 23 and a further switch device 24 assigned to the resistor 23 can also be assigned to the energy transmission path 13 in the embodiment as per FIG. 5. As a result of the presence of the series circuit comprising the resistor 23 and the further switch device 24, as per FIG. 4 likewise, the pre-charging circuit 10 can be used variously as required to pre-charge the sections 1 and to discharge the sections 1, depending on whether the resistor 23 is activated via the further switch device 24 or remains deactivated. This means that the energy transmission path 13 can act as a consumer unit when the further switch device 24 is closed. When however sections 1 are coupled to the energy transmission path 13 exclusively via diode groups 11, i.e. no partial switch devices are assigned to them, these sections 1 cannot be discharged via the resistor 23.

In summary, the present invention therefore relates to the following substantive matter:

A DC voltage network has a plurality of sections 1, which can be connected together and separated from each other individually or in groups via a respective switch element 5. A pre-charging circuit 10 has diode groups 11, a switch device 12, an energy transmission path 13 and a controller 14. Each of the sections 1 of the DC voltage network is coupled to the energy transmission path 13 via at least one respective diode group 11. The energy transmission path 13 is consistently the same for the diode groups 11. The controller 14 transmits a control signal S to the switch device 12 in order to pre-charge sections 1. The switch device 12 thereby switches the energy transmission path 13 so as to be conductive for all of the sections 1 that are coupled to the energy transmission path 13.

The present invention has many advantages. For example, it is possible by means of the inventive pre-charging circuit to charge a plurality of sections 1 of the DC voltage network concurrently. In this context, the monitoring devices 19, 27 ensure that the design limits of the pre-charging circuit 10 are not exceeded. The system is modular. In particular, a plurality of pre-charging circuits 10 can be used. For example, it is possible to deploy a plurality of pre-charging circuits 10 in order to increase the effective current. It is also possible to pre-charge different groups of sections 1 via a dedicated pre-charging circuit 10 in each case. For example, one pre-charging circuit 10 can be connected to the sections 1b to 1h, while another pre-charging circuit 10 is connected to the sections 1a, 1d and 1i to 1m. In this type of configuration, the pre-charging circuits 10 can be embodied variously when required, for example one according to FIG. 4 and one according to FIG. 5. In the case of the embodiment of the pre-charging circuit 10 according to FIG. 5, it is also possible to couple a dedicated energy source to the energy transmission path 13 specifically for the purpose of pre-charging the sections 1. The winding 25 for coupling the energy source can be adapted in this case, in terms of the number of turns per unit length, to the nominal voltage of the energy source relative to the nominal voltage of the DC voltage network. The design of the pre-charging circuit 10 is very simple. The dimensioning of the pre-charging circuit 10 can be effected as required. Irrespective of the dimensioning, it is nonetheless possible to pre-charge even batteries or other large energy stores contained in the sections 1.

A further advantage is that the diode groups 11 and correspondingly the inputs of the pre-charging circuit 10 need not be configured for the full power of the pre-charging circuit 10. When the corresponding requirement occurs, it is possible for example to attach a specific section 1 of the DC voltage network, for example the section 1c, to two or three diode groups 11. A numerical example of this: let it be assumed that the switch device 12 and the energy transmission path 13 are dimensioned for an energy transmission of 1.5 kW, but the diode groups 11 for only 500 W in each case. When in such a case a specific section 1 of the DC voltage network is attached to three diode groups 11, it is possible to realize the full energy transmission of 1.5 kW between this section 1 of the DC voltage network and the pre-charging circuit 10. It is even possible to dimension the diode groups 11 variously, for example one diode group 11 for an energy transmission of 1.0 kW and another diode group 11 for an energy transmission of 500 W.

Further advantages are that the pre-charging is low-loss and no voltage control or coordination is required. The sections 1 are always charged to the voltage U of the section 1 having the highest voltage U.

Various further embodiments are additionally possible. For example, the voltages of the sections 1 can be measured within the pre-charging circuit 10 and used for display, diagnostic or control purposes, or transmitted to a supervisory device (for example a network management entity). It is also possible to output a message when the pre-charging of the sections 1 is complete. It is also possible to terminate the pre-charging automatically when the active duration of the switch device 12 exceeds a predetermined value. In the case of the embodiment according to FIG. 4, it is further possible to terminate the pre-charging automatically when the voltage difference dropping over the diode groups 11 falls below a threshold value or when the potential occurring at the base points of the diode groups 11 is sufficiently far from the negative potential P2. The starting of the pre-charging can satisfy inverse conditions. In order to prevent continuous back-and-forth switching, the respective switching status of the pre-charging circuit 10 can be preserved for a minimum time or hysteretic operation can be implemented when applicable.

It is also possible to arrange switches in the lines between the nodal points 16 and the taps 17. In this case, it is possible by means of these switches to select whether the respective section 1 is effectively attached to the pre-charging circuit 10 or not.

Although the invention is illustrated and described in detail with reference to the preferred exemplary embodiment in the foregoing, the invention is not restricted to the examples disclosed herein, and other variations can be derived therefrom by a person skilled in the art without departing from the scope of the invention.

The invention claimed is:

1. A pre-charging circuit for a plurality of sections of a DC voltage network, wherein the DC voltage network is composed of sections or groups of sections and wherein the sections or groups of sections are connected to one another by switch elements configured to connect and separate the sections or groups of sections from each other, the pre-charging circuit comprising:
a plurality of diode groups, each diode group having two diodes connected in series at a node, with each node being connected to a single section or a single group of sections in one-to-one correspondence;
a switch device bridging the diode groups;
an energy transmission path, which is identical for the plurality of diode groups and which is coupled via the switch device and via at least one node of the diode groups to a respective sections of the DC voltage network; and
a controller transmitting to the switch device a control signal which controls the switch device and switches the energy transmission path to be conductive for all sections of the DC voltage network that are coupled to the energy transmission path, to pre-charge other sections of the DC voltage network that are separated from the pre-charging circuit by their respective switch elements.

2. The pre-charging circuit of claim 1, wherein the energy transmission path comprises an inductive element.

3. The pre-charging circuit of claim 1, wherein each section or each group of sections is connected to two potentials of the plurality of diode groups, with only one of the two potentials being coupled to the energy transmission path.

4. The pre-charging circuit of claim 3, wherein the switch device is arranged in the energy transmission path.

5. The pre-charging circuit of claim 1, wherein each section or each group of sections is connected to two potentials of the plurality of diode groups, with both potentials being coupled to the energy transmission path and with the energy transmission path being galvanically isolated from the diode groups.

6. The pre-charging circuit of claim 5, wherein the switch device comprises a plurality of partial switch devices, with each partial switch device being assigned to a separate diode group.

7. The pre-charging circuit of claim 6, wherein the controller activates the plurality of partial switch devices with a common control signal.

8. The pre-charging circuit of claim 6, wherein the control signal transmitted by the controller causes the partial switch devices to connect the section that is connected to the separate diode group to the energy transmission path so as to operate as an inverter.

9. The pre-charging circuit of claim 1, wherein the energy transmission path comprises a resistor and a further switch device connected in series with the resistor, causing the energy transmission path to operate as a load when the further switch device is closed.

10. A DC voltage network, comprising
a plurality of sections;
a switch element for each of the plurality of sections, with switch element configured to connect and separate a respective section of the plurality of sections from other sections of the plurality of sections; and
a pre-charging circuit comprising
   a plurality of diode groups, each diode group having two diodes connected in series at a node, with each node being connected to a single section or a single group of sections in one-to-one correspondence,
   a switch device bridging the diode groups,
   an energy transmission path, which is identical for the plurality of diode groups and which is coupled via the switch device and via at least one node of the diode groups to a respective sections of the DC voltage network, and
   a controller transmitting to the switch device a control signal which controls the switch device and switches the energy transmission path to be conductive for all sections of the DC voltage network that are coupled to the energy transmission path, to pre-charge other sections of the DC voltage network that are separated from the pre-charging circuit by their respective switch elements.

11. The DC voltage network of claim 10, wherein each section or each group of sections is connected to two potentials of the plurality of diode groups, and wherein at least a subset of the switch elements is designed such that, depending on a switching status of the respective switch element, the subset of the switch elements separate or connect only one of the two potentials of the sections from/to each other, while the other of the two potentials is permanently B connected.

12. The DC voltage network of claim 10, wherein each section or each group of sections is connected to two potentials of the plurality of diode groups, and wherein at least a subset of the switch elements is designed such that, depending on a switching status of the respective switch element, the subset of the switch elements separate or connect both potentials of the sections from/to each other.

13. The DC voltage network of claim 10, wherein each of the switch elements has an electronic switch arrangement and an electromechanical switch connected in series at a tap, with the electromechanical switch disposed proximate to the respective section, wherein the plurality of sections are connected via the taps to the plurality of diode groups.

* * * * *